PULSE CIRCUITRY STABILIZATION

Filed July 23, 1957 2 Sheets-Sheet 1

INVENTOR.
ALBERT A. AUERBACH

BY Wade Koontz
George Fine
ATTORNEYS

July 28, 1959 A. A. AUERBACH 2,897,265

PULSE CIRCUITRY STABILIZATION

Filed July 23, 1957 2 Sheets-Sheet 2

INVENTOR.
ALBERT A. AUERBACH
BY Wade Koontz
and George Fine
ATTORNEYS

United States Patent Office 2,897,265

Patented July 28, 1959

2,897,265

PULSE CIRCUITRY STABILIZATION

Albert A. Auerbach, New York, N.Y., assignor to the United States of America as represented by the Secretary of the Air Force Application July 23, 1957, Serial No. 673,749

6 Claims. (Cl. 178—71)

This invention relates to pulse circuitry, and particularly to the preselection and stabilization of the direct current operating level of an electron discharge device, to impart to such a device a constant operating level regardless of variations in the excitation currents associated therewith.

In a television system, particularly at the transmitter, there are present control voltages including video and synchronizing impulses of large magnitudes. These are to be impressed upon the control elements such as the grids of electron discharge devices. Usually these grids are biased at a preselected direct current operating level in order to obtain the requisite signals for transmission of images to television receivers. Video impulses impressed upon the grid of an electron discharge device, such as a modulator tube, may drive the grid positive into the grid current region and periodic negative synchronizing impulse may drive the electron discharge device to cut-off. The aforesaid impulses thus applied to the electron discharge device will tend to vary the preselected direct current operating level established at the control element, namely, the grid. This variation will be reflected in the output of the electron discharge device and will not be representative of the input control signals such as video and synchronizing impulses.

Accordingly, it is an object of this invention to provide new and improved apparatus for establishing a bias voltage at an electron discharge device at a preselected direct current level.

Another object of this invention is to provide new and improved apparatus for automatically stabilizing the aforesaid bias voltage at the preselected direct current level.

A further object of this invention is to clamp the bias voltage on an electron discharge device to a preselected direct current level, and from this level video voltage may drive the grid positive into the grid current region and periodic negative synchronizing impulses may drive the electron discharge device to cut-off, without affecting the said preselected direct current level.

In a preferred embodiment of this invention, a diode is connected to the grid of a television transmitter modulator tube. The said diode is biased to the sum of the preselected direct current level plus the required voltage of the periodic negative synchronizing impulse. When grid current raises the modulator tube bias, the diode passes and rectifies the peaks of the synchronizing pulse. The resultant direct current is applied to the grid of a control tube, whose plate voltage changes to effect a correction of the modulator tube bias.

For a better understanding of my invention, together with other and further objects, advantages and capabilities thereof reference is made to the following description and appended claims in connection with the accompanying drawings in which:

Figure 1:
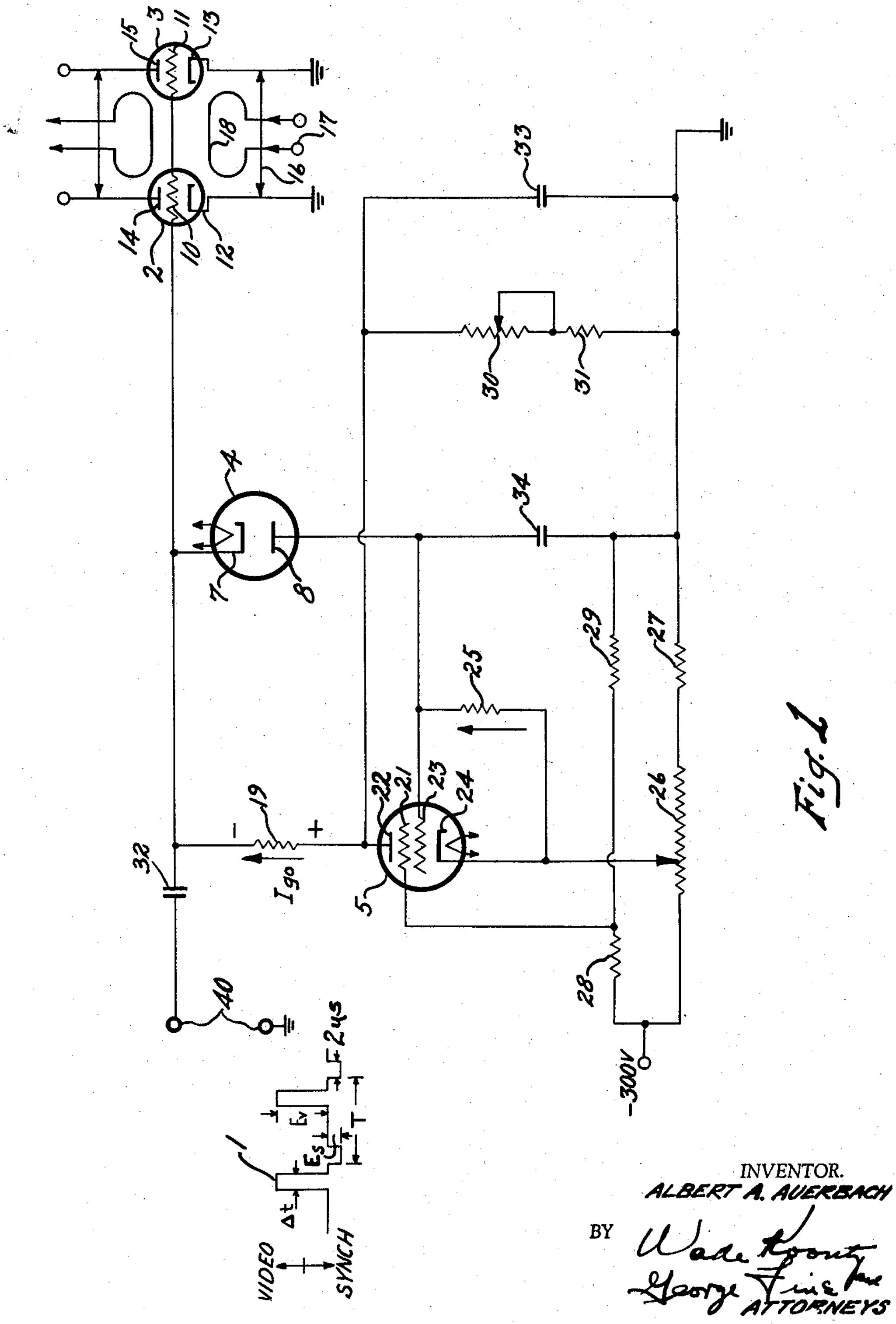
Fig. 1 is a schematic diagram of a specific embodiment of a bias stabilizer circuit for a television transmitter modulator tube.

Now referring to Fig. 1, the television transmitter modulator tubes 2 and 3 in parallel are grid modulated by input video and synchronizing impulses impressed upon input terminals 40, and then coupled to said tubes by way of capacitor 32. These impulses are comprised of video impulses of amplitude $E_v$ and periodic two microsecond negative synchronized impulses of amplitudes $E_s$ and repetition rate of 16.2 kilocycles as shown at 1. The preselected direct current level on the parallel control grids 2—11 of parallel television transmitter modulator tubes 2 and 3 is $-E_g$, this level is established by adjusting the plate load resistor 30 of control tube 5 (such as a 6Y6). Control tube 5 having two control grids 21—23, anode 5, and cathode 24. Adjustable load resistor 30 controls the initial plate to cathode voltage characteristic of tube 5 and thereby establishes a preselected voltage upon control grids 2—11 of modulator tubes 2 and 3 by way of resistor 19.

Diode 4 is biased to a magnitude of $-(E_g+E_s)$. Thus the negative peaks of synchronizing impulses $E_s$ do not cause current flow through diode 4. Between synchronizing impulses, cathode 7 of diode 4 is at $+E_s$ with respect to plate 8 of diode 4, so that no current can pass through the said diode in that interval. Negligible current flows through resistor 25, which placed cathode 24 of tube 5 at the plate potential of diode 4, i.e. $(E_g+E_s)$.

A fixed grid current $I_{go}$ (which is a function of $-E_g$ and R.F. excitation of modulator tubes 2 and 3 coupled into cathode line 16 by way of R.F. input terminals 17 and inductance loop 18) flows through resistor 19 as shown. The potential drop across control tube 5 is $+E_p$ (i.e. the plate potential with respect to cathode 24) the D.C. relations thus are expressed by equation:

$$E_p-I_{go}R_{19}-E_s=0 \quad (1)$$

The plate potential $E_p$ is set by means of adjusting potentiometer 30 which is part of a voltage dividing network comprised of potentiometer 30 and resistor 31. The cathode potential of tube 5 is adjusted by means of potentiometer 26 which is a part of voltage dividing network comprised of potentiometer 26 and resistor 27. The cathode potential of tube 5 is designated as $E_B$, then $E_B=E_s+E_g$ and is set by bias level control potentiometer 30.

Positive video signal $E_v$ applied to parallel grids 10—11 of modulator tube 2—3 respectively may vary in width. Considering the video as a single pulse, $\Delta t$ may vary from 0 to possibly 11 microseconds with a corresponding variation in duty cycle 0 to 16%.

Figure 2:
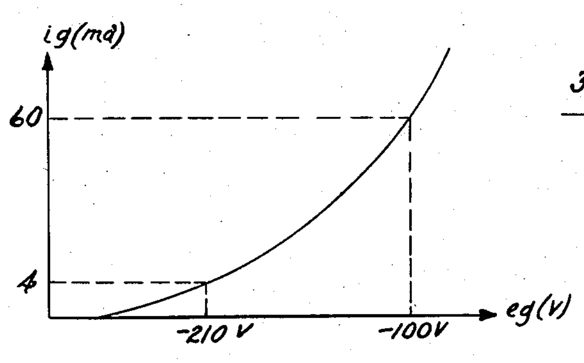
Fig. 2 shows a curve for grid current against grid voltage of the television transmitter modulator tube.
Figure 3:
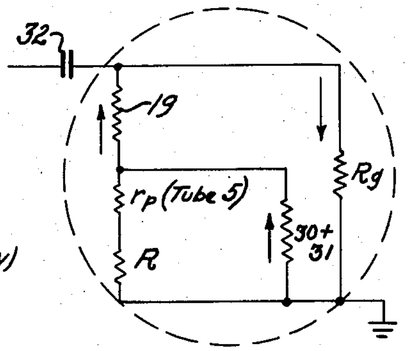
Fig. 3 shows an equivalent circuit for the charging action for input signal coupling capacitor to the transmitter modulator tube in the bias stabilizer circuit shown in Fig. 1.

Referring to Fig. 2, where $i_g$ (grid current) is plotted against $e_g$ (grid voltage) it may be seen that considerably more than 4 milliamperes' grid current will flow during the video pulse interval (4 ma. being the normal grid current flow). An average grid current thus tends to flow depending upon $E_v$ and the video duty cycle. Since $i_g$ flows so as to lower $e_g$, the modulator tube bias tends to depress at a rate determined by $T_{C_{32}}$, the charging time constant for coupling capacitor 32. The equivalent circuit which indicates the charging action is shown in Fig. 3. $R_g$, the grid resistance of parallel modulator tubes 2 and 3, is included since the said tubes necessarily pass the charging or grid current. Since $R_g$ is on the order of 1000 ohms, and resistor 19 is 4000 ohms, it determines $R'_1$, the equivalent resistance primarily, thus $T_{C_{32}}=C_{32}R_{19}$.

Note from Fig. 1 that resistors 30 and 31 are paralleled by capacitor 33 which is on the order of capacitor 32. It will be seen the plate voltage $E_p$ of tube 5 tends to rise when $i_g$ increases, thereby reducing $i_{g_{av}}$ (the average grid current). We may then assume the $i_g$ changes from $I_{go}$ by a value equal to $\Delta i_g$, so that there tends to be a corresponding change in $e_g$ equal to $e_g=R_{19}\Delta i_g$. The effect of capacitor 32 and equivalent resistor $R'_1$, however, is such as to permit only an exponential rise in the bias of modulator tubes 2 and 3. This effect is summarized by the equation:

$$e_g=-E_g-\Delta e_g(1-E=t/T_{C_{32}}) \qquad (2)$$

where $\Delta e_g=(\Delta i_g)R_{19}$, and where $-E_g$ is the bias voltage desired, and is assumed to exist at $t=0$, at which time $i_g$ changes by $\Delta i_g$. The value $e_g$ thus tends to follow a curve such as is shown in Fig. 4.

Figure 4:
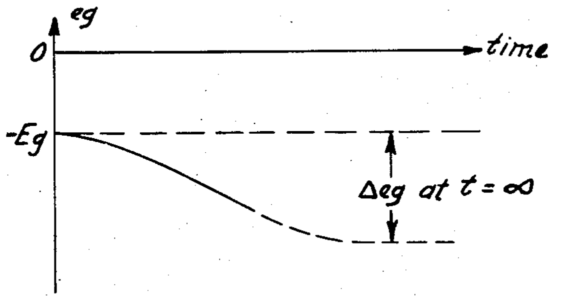
Fig. 4 shows a curve of the variation in grid bias voltage of the television transmitter modulator tube against time.

The curve as shown in Fig. 4 should be modified to indicate the discharging time of coupling capacitor 32 between video pulses. This discharging action is controlled by the time constant $TD_1$ where $TD_1$ equals the product of capacitor 32 and the effective resistance of the network shown in Fig. 3 minus $R_g$.

$T_{C_{32}}=C_{32}R_g$ and $TD_1=C_{32}R''_1$, $R''_1$ being the aforesaid effective resistance minus $R_g$. Resistor 19 alone however is on the order of four times as great as $R_g$, in addition to which we have an additional set of resistive elements in series. Thus $TD_1=10T_{C_{32}}$ so that the curve shown in Fig. 4 is not seriously modified by consideration of the discharging action.

Figure 5:
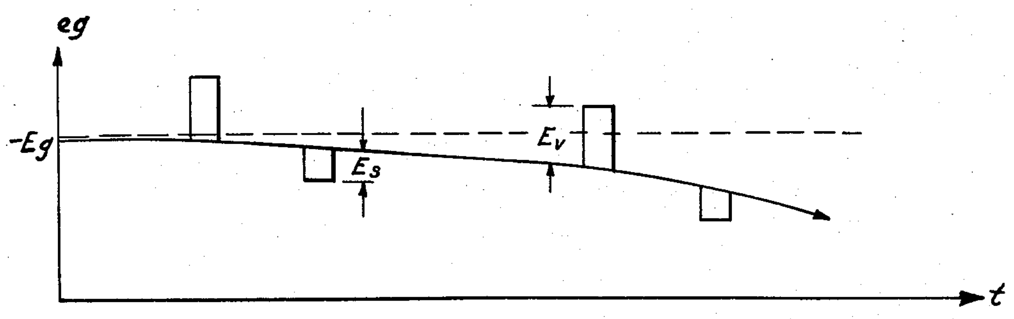
Fig. 5 is a curve showing the voltage depression characteristics of the modulator tube shown in Fig. 1.

As $e_g$ depresses, the video and synchronizing impulses $E_v$ and $E_s$ respectively modulate grids 10—11 of modulator tubes 2 and 3 respectively, upward and downward from the new $e_g$ level existing at the time $t$. This is shown in Fig. 5. This effect is of course exaggerated. In actuality, the effect would become useable only after a considerable number of cycles. Note that the synchronizing impulses $E_s$ are correspondingly depressed as $e_g$ becomes more negative.

Since diode 4 has been biased only by $E_s$, as soon as $e_g$ depresses, diode 4 will pass current on the negative peaks of synchronizing voltage. This current must flow through resistor 25 charging capacitor 34 as shown in current flow path in Fig. 1. Thus grid 23 of tube 5 assumes a potential that is negative with respect to its cathode 24. This potential, which we may call $\Delta e'$, is clearly dependent upon $e_g$, diode 4 plate characteristic, and diode 4 rectifying load, i.e. resistor 25 and capacitor 34. Normally, $\Delta e'=0$, since $i_2$, the current through resistor 25 and diode 4, is negligible. The current through diode 4 will be of a pulsating nature, since it occurs only during the negative synchronizing peaks. It is clear that $\Delta e'$ can, at best, grow exponentially at a rate determined by $T_{C_{34}}=R_D+R_{19}+R_{30+31}(R'_2C_{32}=T_{C_{32}})$, where $R'_2$ is the sum of $R_D$, resistance of diode 4, resistor 30, resistor 31, and resistor 19 as shown in the circuit for current flow through diode 4 in Fig. 6. $R'_2$ is the effective resistance seen from point G. the growth of $\Delta e'$ is modified by the factors mentioned above. Thus we have $$\Delta e'=F(e_g, R_D, R'_2)E^{-t}/R'_2C_{32}$$

where $\Delta e_g=(\Delta i_g)R_{19}$, and where $-E_g$ is the bias voltage resistance. $R_g$ of tubes 2 and 3 in Fig. 1 is not in the circuit of Fig. 6, since $i_2$ flows at times that modulator tubes 2 and 3 are cut off.

Since $(R_D+R_{19}+R_{30}+R_{31})$ is less than $R_{25}$, $R'_2$ is on the order of simply these four resistances. Capacitor 34 is made small, so that $T_{C_{34}}$ is also small. This condition is preferable if $\Delta e'$ is to grow rapidly, as will be seen, $\Delta e'$ is a control voltage which effects the bias stabilization of modulator tubes 2 and 3. The more rapidly $\Delta e'$ is built up, the more rapid is the bias stabilizing action. Thus, we maintain the relation: $T_{C_{34}}$ is less than $T_{C_{32}}$.

Figure 6:
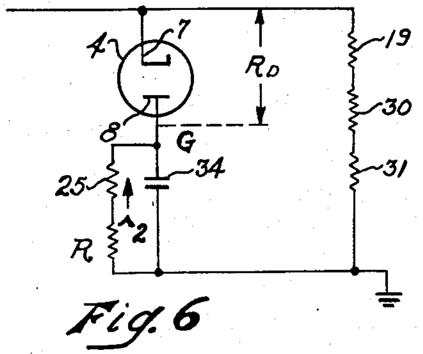
Fig. 6 shows a circuit for the charging resistance of stabilizer circuit shown in Fig. 1.

At this point consider $T_{D_2}$, the discharge constant for the circuit of Fig. 6 during the discharge interval, $R_D$ is out of the circuit, since diode 4 is biased beyond cut-off. Thus, $T_{D_2}=C_{34}R_{25}$ and $T_{C_{34}}=C_{34}R'_2$.

However, $R_{25}$ is less than $R'_2$, so that the discharge of capacitor 34 proceeds much less rapidly than its charging, thus $T_{D_2}$ is less than $T_{C_{34}}$ and this condition likewise is favorable for rapid compensation action.

Having examined the circuit action to the point of noting the creation of a voltage $\Delta e'$ when a change in $e_g$ occurs, the bias stabilization effect can be considered. $\Delta e'$ is a negative voltage. Its effect is therefore to reduce the current through tube 5. The voltage $e_p$ (which has been set at $e_p=E_p$) consequently increases but again its growth is exponentially limited by capacitor 33 across the plate load resistors 30 and 31 of Fig. 1. This, however, is desirable, since $e_g$ has been exponentially decreasing. In fact, it is desirable to have $T_{C_{33}}=R'_3=T_{C_{32}}$. Thus, the rate at which $e_g$ depresses is the same rate at which $e_p$ rises. $R'_3$ is the charging resistance for capacitor 33, the equivalent circuit being obvious from Fig. 1.

The effect of $e_p$ rising is to oppose the decreasing $e_g$ and provide a compensating voltage on plate 22 of tube 5. The magnitude of the change in $e_p$ is such as to provide an equal (and opposite) change to $e_g$ at grids 10 and 11 of modulation tubes 2 and 3 respectively. We thereby provide a complete grid voltage, i.e., bias stabilization at the grid of modulator tubes 2 and 3.

What is claimed is:

1. Apparatus to establish and automatically maintain a preselected D.C. voltage level at the control grid of a first discharge device drawing grid current comprising means to feed a signal consisting of positive and negative impulses by way of a capacitor to said control grid electrode, a second electron discharge device having grid, anode and cathode electrodes operating to establish said D.C. voltage level, said anode electrode of said second device being connected to said control grid of said first device by way of a resistor, a single diode serving to maintain said D.C. voltage level, having anode and cathode electrodes and only being responsive to said positive and negative impulses applied to said cathode electrode of said diode, said diode interconnecting said first device and said second device, a variable voltage source connected to said cathode electrode of said second device, and means for controlling the gain of said second device.

2. Apparatus to establish and automatically maintain a preselected D.C. voltage as defined in claim 1 including a first capacitor connected from said anode of said diode to ground and a second capacitor in parallel with said gain control means.

3. Apparatus to establish and automatically maintain a preselected D.C. voltage level at the control grid electrode of a first electron discharge device drawing grid current comprising means to feed a signal consisting of video and synchronizing impulses by way of a capacitor to said control grid electrode, a second electron discharge device operating to establish said D.C. voltage level and having grid, anode and cathode electrodes, said anode of said second device being connected to said control grid electrode of said first device by way of a resistor, said cathode electrode of said second device being connected to a variable voltage source and simultaneously by way of a resistor to said grid electrode of said second device, a third electron discharge device serving to automatically maintain said D.C. voltage level and having anode and cathode electrodes, said cathode electrode of said third device being connected to said control grid of said first device, said anode electrode of said third device being connected to said grid electrode of said second device, and a variable resistor connected between ground and said anode electrode of said second device.

4. Apparatus to establish and maintain a preselected D.C. voltage level as defined in claim 3 also including a first capacitor connected from said anode electrode of said third electron discharge device to ground and a second capacitor in parallel with said variable resistor.

5. Apparatus to establish and automatically maintain a preselected D.C. voltage level at the control grid electrode of a first electron discharge device drawing grid current comprising means to feed a signal consisting of positive and negative impulses by way of a capacitor to said control grid electrode of said first electron discharge device, a second electron discharge device operating to establish said D.C. voltage level and having control grid, screen grid, anode and cathode electrodes, said anode electrode of said second device being connected to said control grid of said first electron discharge device by way of a resistor, said cathode electrode of said second device being connected to a variable voltage source and simultaneously to said control grid electrode of said second device by way of a resistor, said screen grid electrode being connected to a fixed voltage source, a variable resistor connected from said anode electrode of said second device to ground, and a single diode serving to maintain said D.C. voltage level and having anode and cathode electrodes, said cathode electrode being connected to said control grid of said first device, said anode electrode being connected to said control grid of said second device.

6. Apparatus to establish and automatically maintain a preselected D.C. voltage level as defined in claim 5 also including a first capacitor connected from said anode electrode of said diode to ground and a second capacitor in parallel with said variable resistor.

References Cited in the file of this patent

UNITED STATES PATENTS 2,550,178 Wendt ---------------- Apr. 24, 1951